United States Patent
Barickman

[19]
[11] Patent Number: 5,876,287
[45] Date of Patent: Mar. 2, 1999

[54] DUAL-RATE COUPLING EXHIBITING AN ULTRA-SOFT INITIAL SPRING RATE AND BONDED COMPONENT THEREFOR

[75] Inventor: James R. Barickman, Erie, Pa.

[73] Assignee: Lord Corporation, Cary, N.C.

[21] Appl. No.: 896,660

[22] Filed: Jul. 18, 1997

[51] Int. Cl.[6] .................................................. F16D 3/64
[52] U.S. Cl. .................................. 464/82; 464/83; 464/89
[58] Field of Search ............................. 464/73, 75, 83, 464/84, 85, 87, 89, 100, 101

[56] References Cited

U.S. PATENT DOCUMENTS

| | | | |
|---|---|---|---|
| 1,941,061 | 12/1933 | Thiry | 464/89 |
| 1,954,190 | 4/1934 | Zeder | 464/89 |
| 2,004,299 | 6/1935 | Snyder | 464/89 |
| 2,195,993 | 4/1940 | Morrill | 464/80 |
| 2,208,314 | 7/1940 | Synder | 464/73 |
| 2,295,003 | 9/1942 | Natkins | 464/73 |
| 2,466,440 | 4/1949 | Kiekhaefer | 464/89 |
| 2,550,101 | 4/1951 | Wallerstein, Jr. | 464/83 |
| 2,659,219 | 11/1953 | Mosso et al. | 464/83 |
| 2,822,676 | 2/1958 | Horovitz | 464/89 |
| 2,892,646 | 6/1959 | Doble | 464/89 |
| 3,386,264 | 6/1968 | Paulsen | 464/74 |
| 3,438,222 | 4/1969 | Paulsen | 464/74 |
| 3,727,431 | 4/1973 | Yokel | 464/17 |
| 4,037,431 | 7/1977 | Sugimoto | 464/73 |
| 4,424,046 | 1/1984 | Ziegler | 464/83 |
| 4,516,956 | 5/1985 | Staiert | 464/89 |
| 4,634,391 | 1/1987 | Entringer et al. | 440/75 |
| 4,678,452 | 7/1987 | Nelson et al. | 464/73 |
| 4,772,245 | 9/1988 | Readman et al. | 464/89 |
| 4,861,313 | 8/1989 | Zeiser et al. | 464/89 |
| 5,522,747 | 6/1996 | Kirschey | 440/83 |
| 5,531,642 | 7/1996 | Shiomi et al. | 464/85 |
| 5,573,462 | 11/1996 | Sweeney et al. | 464/90 |

*Primary Examiner*—Eileen Dunn Lillis
*Attorney, Agent, or Firm*—Randall S. Wayland; Richard K. Thomson

[57] ABSTRACT

A dual-rate drive coupling (20) for use in transmitting drive torque between drive and driven members. The first torque rate is near zero for no-load and near no-load conditions. A pair of flexible elastomeric arms (24, 26) which is preferably bonded to the inner member (22) are received in recessed portions (44, 46) in the outer member (40) and provide the coupling with this first very low torque rate. When higher torque loading produces a relative rotation between the outer member (40) and the inner member (22) of at least about 15°, a pair of snubbing arms (28, 30) of the inner member (22) interact with surfaces of openings (48, 50) of the outer member (50). The contact surfaces of these second snubbing arms (28, 30) are coated with an elastomer to snub all contact between the inner member (22) and the outer member (40) to inhibit vibration induced rattling. In a second preferred embodiment, the elastomeric arms are curved in opposite directions and the metal arms are skewed away from drive engagement such that a relative rotation of at least about 25° is needed to bring the second pair of arms (28, 30) into driving engagement with the outer member (40).

18 Claims, 4 Drawing Sheets

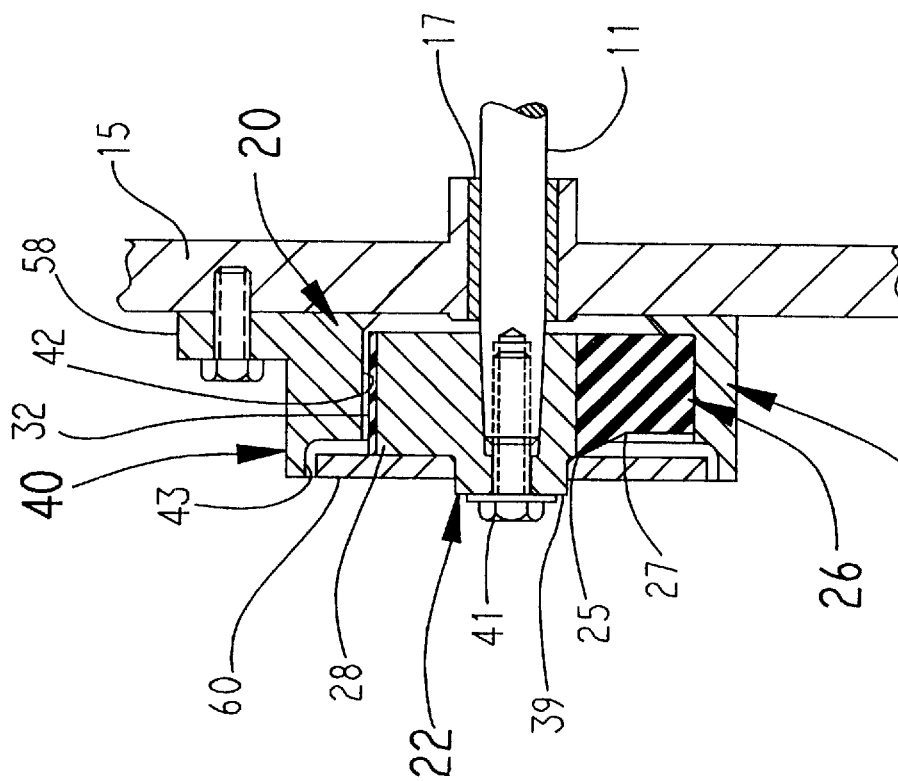
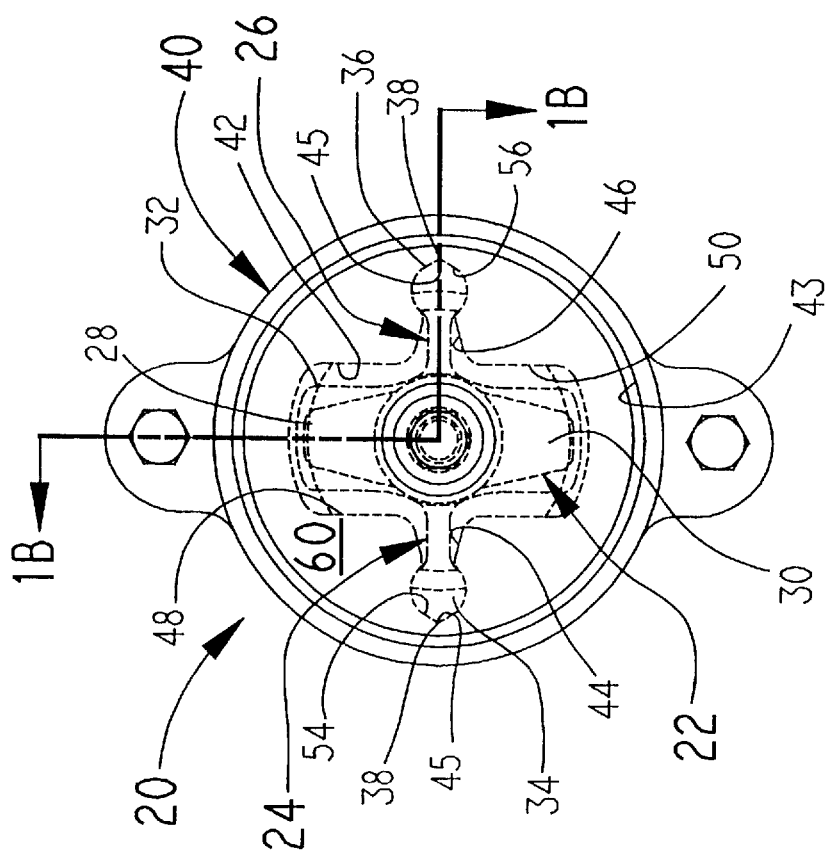
Fig. 1B
Fig. 1A

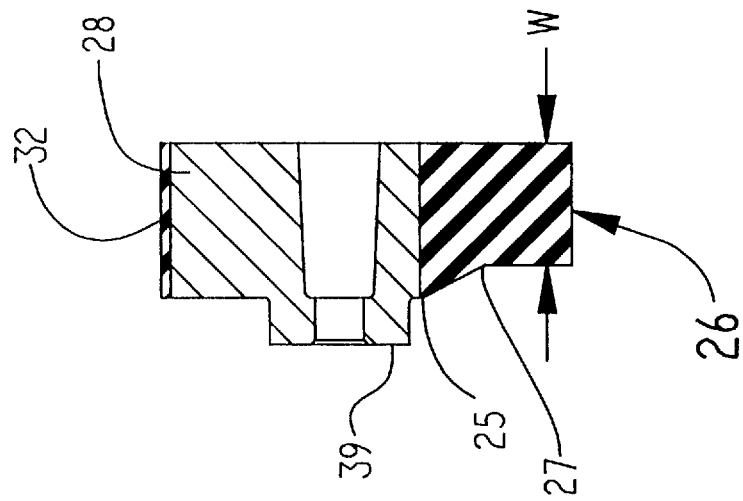
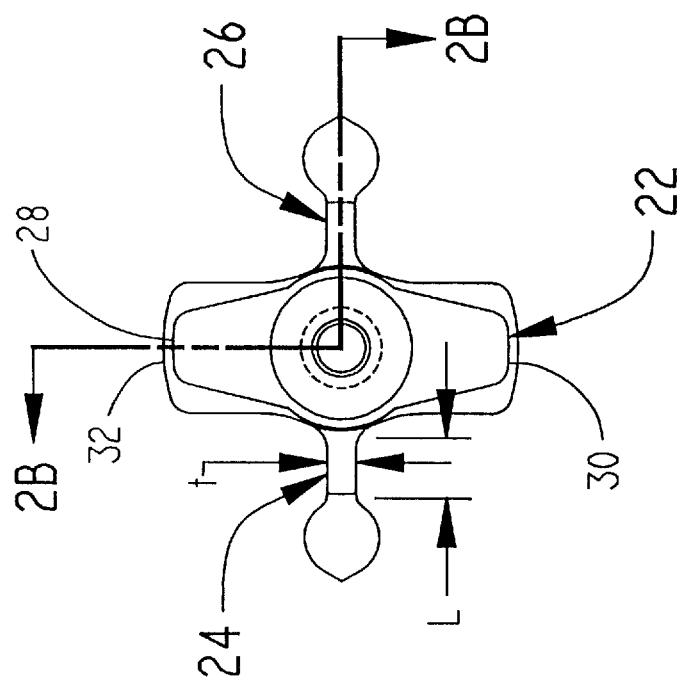

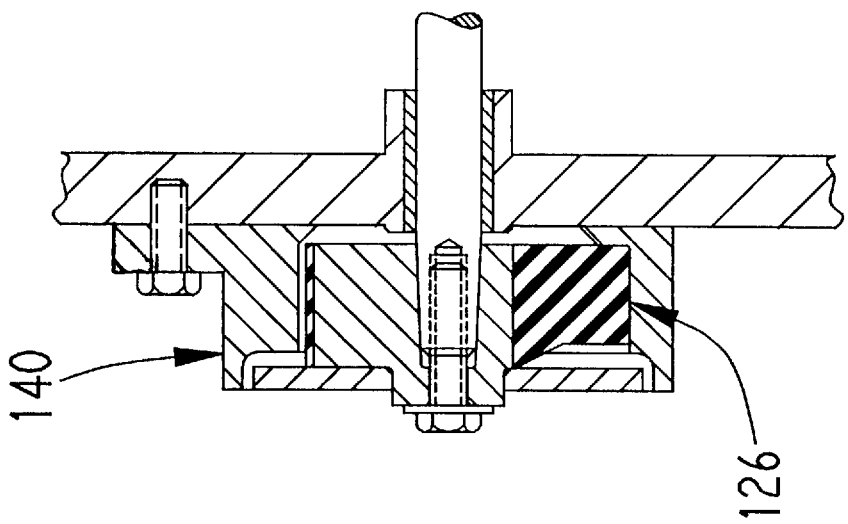
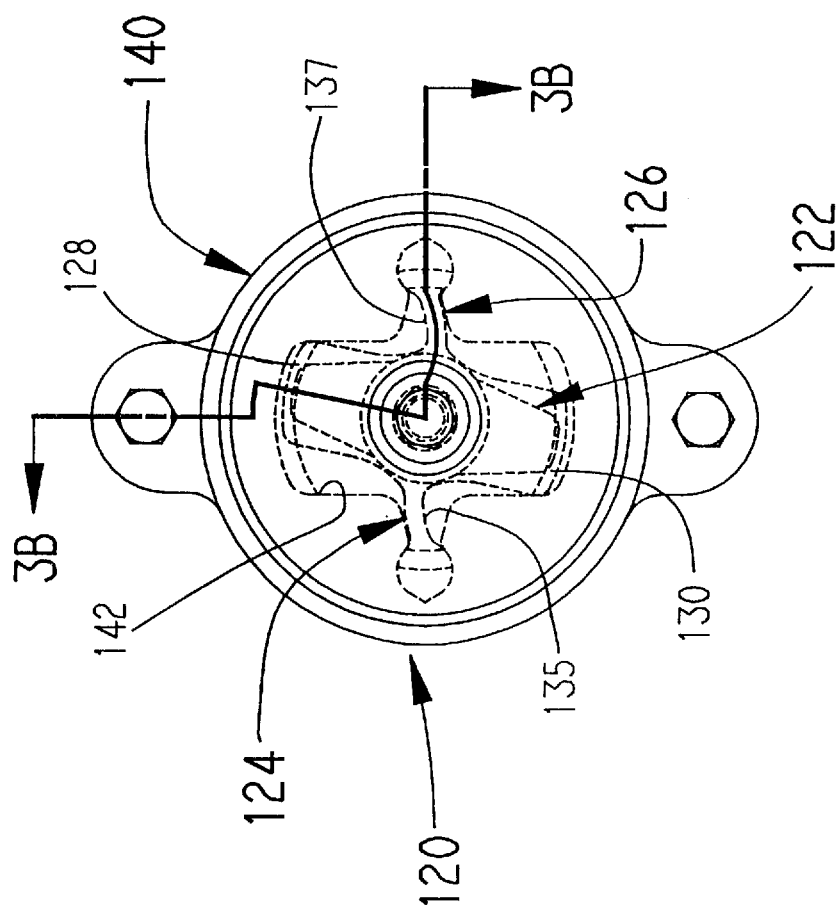

DUAL-RATE COUPLING EXHIBITING AN ULTRA-SOFT INITIAL SPRING RATE AND BONDED COMPONENT THEREFOR

BACKGROUND AND SUMMARY OF THE INVENTION

This invention is directed to a dual-rate coupling and bonded component therefor for transmitting drive torque to between drive and driven members. More particularly, the present invention is directed to a dual-rate coupling which has near zero stiffness at low torque loadings.

Drive couplings are known which transmit torque through an elastomer member, such as described in U.S. Pat. Nos. 4,772,245, 4,634,391, 4,516,956, 2,195,993, and 1,941,061. Single stage couplings have the problem in that at no-load or near no-load torques, a rattle may be produced between the drive and driven components that manifests itself as noise in the drive assembly. In addition to the obvious auditory irritation, the rattle produces accelerated wear on the chattering parts. To solve this, a low torsional stiffness is desired. However, the concomitant result of low torsional stiffness is large torsional windup. To solve this dilemma, dual-rate couplings have been developed which limit torsional deflections yet, at the same, time provide low initial stiffnesses. Such multi-rate couplings are described in U.S. Pat. Nos. 5,573,562, 5,522,747, 3,727,431, 3,438,222, 3,386,264, and 2,822,676. Notably, known dual-rate couplings may still provide an initial stiffness that is too great for some applications.

The dual-rate drive coupling of the present invention solves this rattle problem by providing very low, near zero stiffness at no-load or near no-load torques, yet provides a high stiffness for transmitting torques, when needed at higher torques.

Accordingly, the dual-rate drive coupling of the present invention comprises an inner member including a pair of snubbing arms; a pair of elastomeric arms extending outwardly from the inner member, each of the elastomeric arms having a length, a width and a thickness, where the length is greater than the thickness; and an outer member including a first pair of openings which receive the pair of elastomeric arms and a second pair of openings receiving the pair of snubbing arms, the pair of elastomeric arms interconnecting to said outer member at outer portions thereof whereby the pair of elastomeric arms exhibit near zero torsional stiffness and the pair of snubbing arms drivingly interconnect with the second pair of openings as torque increases above said minimum threshold torque level.

In another aspect, the pair of snubbing arms are coated on all surface portions engaging the second pair of openings with elastomer to prevent metal-to-metal contact. Preferably, the metallic portion of each of pair of snubbing arms tapers toward an outer end and a coating of elastomer is shaped to render the second pair of arms generally rectangular. In another aspect, the elastomer arms have at their terminus an enlarged portion which is received in similarly configured recesses formed in the outer member. Preferably, these enlarged portions are compressed within the similarly configured portions. To further prevent rotation, the enlarged protrusion preferably has an hyperextended portion which engages in a notch in a similarly configured portion of said outer member to provide an orientation feature. In another aspect of the invention, each of the pair of elastomer arms is compressed along their length in order to further reduce torsional stiffness. In yet another aspect, the elastomer arms have a slight curvature which skews the pair of radially extending snubbing arms within the second pair of openings, in a zero load condition, away from contact between a pair of drive surfaces on said pair of snubbing arms and said second pair of openings and a driven surface on said second pair of openings. This skewing of said pair of radially extending snubbing arms may be, at least in part, due to a characteristic premolded into said pair of elastomer arms.

Various other features, advantages and characteristics of the present invention will become apparent after a reading of the following detailed description of the preferred embodiments of the present invention.

BRIEF DESCRIPTION OF THE DRAWINGS

The preferred embodiment(s) are described in connection with the drawings, like parts bearing like reference numerals and, in which FIG. 1A is a front view of a first embodiment of the dual-rate coupling of the present invention;

FIG. 1B is a cross-sectional side view as seen along line 1B—1B in FIG. 1A;

FIG. 2A is a front view of the bonded component of the first embodiment of the dual-rate coupling;

FIG. 2B is a cross-sectional side view of the bonded component as seen along line 2B—2B in FIG. 2A;

FIG. 3A is a front view of a second embodiment of the present invention in a no-load condition;

FIG. 3B is a cross-sectional side view of the dual-rate coupling as seen along line 3B—3B in FIG. 3A.

DETAILED DESCRIPTION OF THE PREFERRED EMBODIMENTS

Figure 3C:
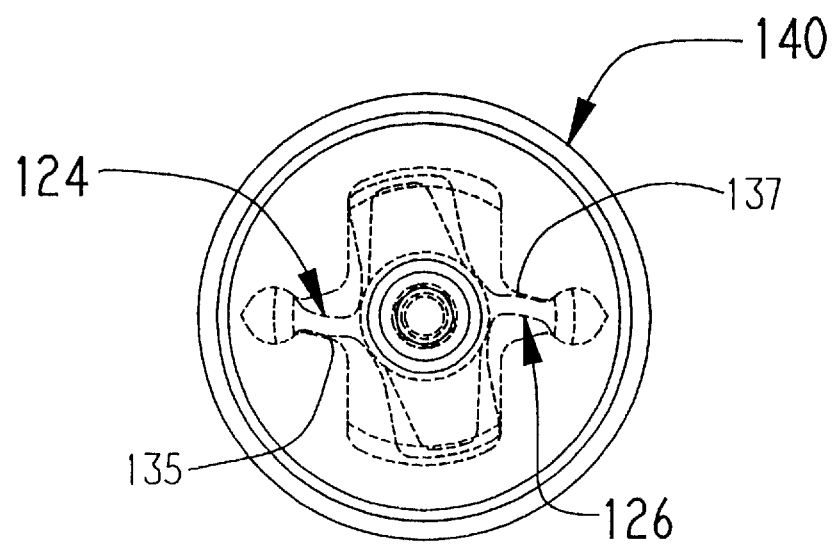
FIG. 3C is a front view of the second embodiment shown in driving engagement.

A first embodiment of the dual-rate drive coupling of the present invention is shown in FIGS. 1A and 1B generally at 20. Coupling 20 comprises an inner member 22 and an outer member 40. The bonded component is shown in detail in FIGS. 2A and 2B. Referring to FIGS. 1A–2B, a slender pair of elastomeric arms 24, 26 which are preferably bonded to the periphery of inner member 22, extend outwardly in generally radially opposing directions from said inner member 22. A pair of generally radially extending snubbing arms 28, 30, which are preferably powdered metal, on the inner member 22 extend in a second generally orthogonal radial direction. Tapered surfaces of arms 28, 30 will interconnect with the inner periphery of the orifice 42 formed in outer member 40 upon rotation therein. Preferably, the tapered surfaces are coated with elastomeric coating 32. This provides corrosion protection and lessens shock encountered upon snubbing with openings 48, 50. Snubbing arms 28, 30 taper outwardly and the elastomeric coating 32 is shaped to render the basic configuration of the second set of arms 28, 30 generally rectangular to match the generalized shape of the openings 48, 50 such that the engaging surfaces of each element are coplanar.

At the outer extension or terminus of each of elastomeric arm 24, 26 is formed as an enlarged portion 34, 36, respectively. The enlarged portions are preferably cylindrically-shaped and have pointed protrusions 38 formed at their radial outermost extension. As best seen in FIG. 1B, the thickness of each arm 24, 26 tapers from their innermost portion 25 to a midportion 27. Inner member 22 has a central protruding stem 39 that serves as a bearing surface for threaded fastener 41 which is used to attach the inner member 22 to a driven member 11 (shown as a shaft). It will be appreciated that for other applications, the drive and driven member may be interchanged.

Outer member 40 has a generally cruciform-shaped (cross-shaped) orifice 42 extending axially therethrough which includes a first pair of openings 44, 46, which may include a tapered portion, that receive the pair of elastomer arms 24, 26 and a second pair of openings 48, 50 with generally parallel sides which receive the pair of snubbing arms 28, 30. Each of the first pair of openings 44, 46 has a recessed portion 54, 56 that receives enlarged portions 34, 36 of arms 24, 26. Installation into the recessed portion 54, 56 radially precompresses the enlarged portions 34, 36 to secure them in place and minimized any rotation thereof.

In addition, the length of arms 24, 26 is such that installation in the recessed portions 54, 56 of openings 44, 46 produces compression of elastomer arms 24, 26 along their length which further reduces their stiffness. Preferably, the arms 24, 26 have a length L, width W, and thickness t. It is preferable to have a length L which is greater than the thickness t in each of the elastomer arms 24, 26. More preferably, it is desirable to have a length L which is greater than twice the thickness t, and more preferably, about three or more times the thickness t. This provides the appropriate low torsional stiffness characteristics by ensuring that the arms 24, 26 are stressed in combinations of both shear and bending, not just in pure shear as in prior art dual-rate couplings. Further, it enables the arms 24, 26, which act like buckling columns, to buckle and skew the position of the snubbing arms 30, 32 upon installation, as will be described later herein. Each recessed portion 54, 56 of openings 44, 46 includes at least one a notch 45 or other like deviation that receives a respective protrusion 38 which inhibits oscillatory rotary motion of the enlarged portions 34, 36 within similarly-shaped portions 54, 56. Without this orientation feature or some other means to prevent rotational movement, such as adhesive, significant abrasive wear occurs from the resulting relative motion.

Outer member 40 preferably includes an extension 52 that includes an external portion 58, such as a flange, which interconnects to the drive member 15 by way of bolts or other suitable means. In this manner, outer member 40 is interconnected to a drive member 15 and the inner member is interconnected to driven member 11. A bushing 17 or other bearing assembly is desired to provide means for stabilizing the radial movement of the inner member 22 relative to the outer member 40. Persons of ordinary skill in the art would recognize that the present invention bonded component and dual-rate coupling 20 would have application in any system where both a ultra soft initial rate and dual rate is required. A cover plate 60 is pressed onto the stem 39 of inner member 22 to keep debris from being exposed to bushing 17 and elastomer arms 24, 26. Preferably, plate 60 is received in recess 43 formed in outer member 40.

In operation, under no- and low-torque loads, elastomeric arms 24, 26 exhibit near zero torsional stiffness (less than 20 and preferably less than about 2 lbf.-in./degree) so that in the first stage, little or no vibrational energy is transmitted from the drive member 15 attached to outer member 40 to the driven member 11 through inner member 22. Any impact between snubbing arms 28, 30 and openings 48, 50 which does result from relative rotation between the inner 22 and outer 40 members is damped by elastomeric coating 32. As the torque loading increases, outer member 40 will catch up to snubbing arms 28, 30 (member 40 will normally be driven in a clockwise direction as seen in FIG. 1A) and drive surfaces of openings 48, 50 will contact the elastomer on arms 28, 30. Before outer member 40 drivingly engages snubbing arms 28, 30, a relative angular displacement of at least about 15° will take place between the outer member 40 and inner member 22 after which arms 24, 26 will also contact tapered surfaces of openings 44, 46. Elastomeric coating 32 will snub the contact and eliminate chatter while inner member 22 and shaft 11 are positively driven in the second stage of the dual-rate coupling 20.

A second preferred embodiment is shown in FIGS. 3A and 3B generally at 120. In this embodiment, first arms 124, 126 have a slight curvature 135, 137, respectively, with the curvature 135 being cupped in the opposite direction of curvature 137. In addition, the pair of snubbing arms 128, 130 of inner member 122 are skewed within orifice 142 in a direction that is preferably away from driving engagement between outer member 140 and the pair of snubbing arms 128, 130. In this embodiment, when the coupling experiences normal near no-load torque, a portion of the skewing will be overcome bringing snubbing arms 128, 130 into a near a centered position. This will maximize the angular displacement needed to bring outer member 140 into contact with snubbing arms 128, 130, thereby minimizing the possibility of rattling. The curvature of the snubbing arms 128, 130 will also produce an additional resistance to relative movement between outer member 140 and inner member 122. When the torque loading is sufficient to bring outer member 140 into engagement with snubbing arms 128, 130, the curvatures 135, 137 will effectively spring over (see FIG. 3B). A total angular displacement between outer member 140 and inner member 122 of at least about 25° and, if the skewing is as shown in FIG. 3A, as much as about 30°, will be necessary to effect driving engagement under full torque loading (as shown in FIG. 3C) in this second stage of the coupling 120.

Various changes, alternatives, and modifications will become apparent to a person of ordinary skill in the art after a reading of the foregoing specification. It is intended that all such changes, alternatives and modifications as fall within the scope of the appended claims be considered part of the present invention.

I claim:

1. A dual-rate drive coupling, comprising:
   a) an inner member including a pair of radially extending snubbing arms;
   b) a pair of radially extending elastomeric arms extending outwardly from said inner member, each of said elastomeric arms having a length, a width and a thickness, where said length is greater than said thickness;
   c) an outer member including a first pair of openings which receive said pair of radially extending elastomeric arms and a second pair of openings receiving said pair of radially extending snubbing arms, said pair of radially extending elastomeric arms interconnecting to said outer member at outer portions of the elastomeric arms;

whereby said pair of radially extending elastomeric arms exhibit near zero torsional stiffness and said pair of radially extending snubbing arms drivingly interconnect with said second pair of openings as torque increases above said minimum threshold torque level.

2. The drive coupling of claim 1 wherein said pair of radially extending snubbing arms are coated on all surface portions engaging said second pair of openings with elastomer to prevent metal-to-metal contact.

3. The drive coupling of claim 1 wherein a metallic portion of each of said pair of radially extending snubbing arms tapers toward an outer end and a coating of elastomer is shaped to render said pair of snubbing arms generally rectangular.

4. The drive coupling of claim 1 wherein each of said pair of radially extending elastomer arms has at the terminus an enlarged portion which is received in a similarly configured recesses formed in said outer member.

5. The drive coupling of claim 4 wherein each of said enlarged portions is compressed in said similarly configured portions.

6. The drive coupling of claim 4 wherein each said enlarged protrusion has an hyperextended portion which engages in a notch in said similarly configured portion of said outer member to provide an orientation feature for said enlarged portions and reduce wear-induced abrasion thereof.

7. The drive coupling of claim 1 wherein each of said pair of radially extending elastomer arms is compressed along the length in order to reduce torsional stiffness.

8. The coupling of claim 1 wherein each of said pair of radially extending elastomer arms has a slight curvature therein, a curvature of a first of said pair of radially extending elastomer arms being in a direction opposite a curvature in a second of said pair of radially extending elastomer arms.

9. A coupling of claim 8 wherein said pair of radially extending snubbing arms are skewed within said second pair of openings, in a zero load condition, away from contact between a pair of drive surfaces on said pair of radially extending snubbing arms and a pair of driven surfaces on said second pair of openings.

10. A coupling of claim 9 wherein said curvature in said pair of radially extending elastomer arms and said skewing of said snubbing arms within said second pair of openings occurs as a result of an preloading of said pair of radially extending elastomer arms along said length.

11. A coupling of claim 9 wherein said curvature on said pair of radially extending elastomer arms and a skewing of said pair of radially extending snubbing arms is, at least in part, due to a characteristic premolded into said pair of radially extending elastomer arms.

12. A coupling of claim 1 interconnected to a drive and driven member within a drive assembly.

13. A coupling of claim 1 wherein said pair of radially extending snubbing arms drivingly engage said second pair of openings only after an angular displacement of said outer member relative to said inner member of at least about 25° as a result of a skewing.

14. A coupling of claim 1 wherein said pair of radially extending snubbing arms drivingly engage said second pair of openings only after an angular displacement of said outer member relative to said inner member of at least about 15°.

15. A coupling of claim 1 wherein a bonded component is comprised of:
   a) said inner member including said pair of radially extending snubbing arms; and
   b) said pair of slender radially extending elastomeric arms each having an enlarged portion at a terminal portion thereof.

16. A dual-rate drive coupling for transmitting torque from a drive member to a driven member, said drive coupling comprising
   a) a bonded component having a generally cruciform shape, said bonded component interconnected with a first one of the drive and driven members, said cruciform shape being formed by a pair of elastomeric arms extending in a first direction and a second pair of generally radially extending snubbing arms extending in a second generally orthogonal direction;
   b) an outer member having a generally cruciform-shaped orifice, said outer member interconnected with another of the drive and driven members, said generally cruciform-shaped orifice being formed by a first pair of openings which receive said pair of elastomer arms and a second pair of oversized openings which receive said pair of snubbing arms;

whereby said pair of elastomer arms engage said first pair of openings at all times and, up to a minimum threshold torque level, exhibit near zero torsional stiffness, said pair of snubbing arms only drivingly engage said second pair of openings as torque increases above said minimum threshold torque level.

17. A bonded component for a dual-rate drive coupling, comprising:
   a) an inner member having a pair of radially extending snubbing arms,
and
   b) a pair of radially extending elastomeric arms extending outwardly from said inner member, each of said elastomeric arms having a length, a width and a thickness, where said length is greater than said thickness and having an enlarged cylindrical portion at a terminal portion on each of said pair radially extending elastomeric arms.

18. A dual-rate drive coupling, comprising:
   a) an inner member including a pair of generally opposing radially extending snubbing arms;
   b) a pair of slender generally opposed elastomeric arms including an enlarged portion located at their terminal ends, said elastomeric arms bonded to said inner member on opposite sides thereof, each of said elastomeric arms having a length, a width and a thickness;
   c) an outer member including a first pair of openings which receive said enlarged portion of said pair of radially extending elastomeric arms and a second pair of openings receiving said pair of radially extending snubbing arms;

whereby said pair of radially extending elastomeric arms exhibit near zero torsional stiffness and said pair of radially extending snubbing arms drivingly interconnect with said second pair of openings as torque increases above said minimum threshold torque level.

* * * * *